United States Patent
Narumi et al.

(10) Patent No.: US 8,654,393 B2
(45) Date of Patent: Feb. 18, 2014

(54) IMAGE PROCESSOR AND IMAGE PROCESSING METHOD

(75) Inventors: Kazuki Narumi, Kawasaki (JP); Takumi Kaneko, Tokyo (JP); Rie Takekoshi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 403 days.

(21) Appl. No.: 12/962,455

(22) Filed: Dec. 7, 2010

(65) Prior Publication Data

US 2011/0141502 A1   Jun. 16, 2011

(30) Foreign Application Priority Data

Dec. 15, 2009   (JP) ................................. 2009-284027

(51) Int. Cl.
*H04N 1/60* (2006.01)

(52) U.S. Cl.
USPC ........... 358/1.9; 358/3.26; 358/518; 358/520; 358/521; 347/100

(58) Field of Classification Search
USPC ............. 358/1.9, 3.01, 3.06, 3.26, 3.27, 1.18, 358/2.1, 518, 520, 521; 347/15, 100, 101
See application file for complete search history.

(56) References Cited

U.S. PATENT DOCUMENTS

| | | | |
|---|---|---|---|
| 7,347,890 B2 * | 3/2008 | Nito et al. | 106/31.27 |
| 7,463,384 B2 * | 12/2008 | Tsuchiya et al. | 358/1.9 |
| 7,775,618 B2 | 8/2010 | Shimakawa et al. | 347/15 |
| 8,027,058 B2 * | 9/2011 | Jinno | 358/1.9 |
| 2002/0163655 A1 | 11/2002 | Zhou | |
| 2004/0209017 A1 * | 10/2004 | Zahrobsky et al. | 428/32.34 |
| 2005/0168495 A1 | 8/2005 | Nakatani et al. | |
| 2006/0132567 A1 * | 6/2006 | Kawai et al. | 347/100 |
| 2006/0238590 A1 * | 10/2006 | Koga et al. | 347/100 |
| 2007/0273738 A1 * | 11/2007 | Tsuchiya | 347/100 |
| 2007/0291311 A1 | 12/2007 | Yano et al. | |
| 2008/0123120 A1 * | 5/2008 | Ishida et al. | 358/1.9 |
| 2008/0266608 A1 * | 10/2008 | Yamazaki et al. | 358/3.06 |

FOREIGN PATENT DOCUMENTS

| | | |
|---|---|---|
| JP | 2002-331693 A | 11/2002 |
| JP | 2003-237115 A | 8/2003 |
| JP | 2004-181688 | 7/2004 |
| JP | 2005-238835 | 9/2005 |
| JP | 2007-331343 | 12/2007 |

OTHER PUBLICATIONS

Japanese Office Action, dated Sep. 10, 2013, issued in corresponding Japanese App. No. 2009-284027.

* cited by examiner

*Primary Examiner* — Kimberly A Williams
(74) *Attorney, Agent, or Firm* — Fitzpatrick, Cella, Harper & Scinto

(57) ABSTRACT

An image processor and an image processing method are provided which can suppress both a bronzing phenomenon and a color rolling in an inkjet printing apparatus and produce high-quality monochrome pictures. To that end, a monochrome image is processed by generating the multivalued density data for a chromatic ink having a hue component opposite that of the achromatic ink in a low to medium density region and, in a high density region, generating the multivalued density data for a chromatic ink having a reflection light with a hue component opposite that of a reflection light of the achromatic ink. With this arrangement, a high-quality monochrome image can be produced which has hardly noticeable hue deviations and bronzing phenomenon in the entire density grayscale or density range.

18 Claims, 10 Drawing Sheets

|  | EVALUATION OF SOLIDLY PRINTED PATCHES ||||| GRADATION EVALUATION |
|  | INK VOLUME APPLIED (SOLID BLACK) ||| BRONZED COLOR || APPEARANCE OF BLACK |  |
|  | BLACK | CYAN | GREEN | a* | b* |  |  |
| EMBODIMENT | 100% | 0% | 15% | 2.9 | 4.2 | BLACK | SOME COLOR ROLLING OBSERVED IN MEDIUM DENSITY REGION |
| COMPARISON 1 | 100% | 10% | 0% | 3.2 | 5.7 | RED-BROWN | SMALL |
| COMPARISON 2 | 100% | 0% | 15% | 2.9 | 4.2 | BLACK | LARGE |

IMAGE PROCESSOR AND IMAGE PROCESSING METHOD

BACKGROUND OF THE INVENTION

1. Field of the Invention

The present invention relates to an image processor and an image processing method for printing monochromatic images on a print medium using a black ink and a plurality of color inks containing pigments.

2. Description of the Related Art

An inkjet printing apparatus is capable of outputting high-resolution, high-quality images at high speed and has many advantages including low running cost and low noise during output. In recent years there are growing demands for photograph output of as high a quality as that of silver salt pictures and there are a growing number of circumstances where people print not only color pictures but monochrome pictures as well. In such an inkjet printing market, a pigment ink has come to be used more often than before, considering the color stability and fastness of output images.

However, printed materials using a pigment have conventionally been known to have a problem of so-called bronzing, in which a specularly reflected light makes the print look different from its original color. More precisely, in the bronzing phenomenon a reflected light, a hue opposite to a hue of ink color, that is complementary color, is observed in printed parts of a print medium. For example, in areas printed with 100% cyan a red reflected light is seen, giving viewers an incongruous impression.

To cope with such a bronzing phenomenon, Japanese Patent Laid-Open No. 2004-181688 has disclosed a method of overcoating an entire printed surface with a yellow ink that has a relatively low level of bronzing. In this method, the amount of yellow ink applied to an image area of the printed surface having a hue angle close to yellow (180°<H°<360°) is set smaller than that applied to an image area having a hue angle farther away from yellow (0°<H°<180°) in order to prevent the image from looking yellowish more than necessary.

However, the vigorous studies conducted by the inventors of this invention has found that in printing a monochromatic image using a pigment ink, the method disclosed by Japanese Patent Laid-Open No. 2004-181688, though it can suppress the bronzing, has resulted in a yellowish hue emerging over the entire image to an extent that makes the viewer feel incongruent.

It has been known that monochromatic images printed with only an achromatic ink, whether it be a pigment ink or not, become slightly tinged with color depending on the kind of a print medium. To deal with such a hue deviation, a technique has been proposed which, while using mainly an achromatic ink, mixes a chromatic ink in it for printing in order to get the hue deviation back toward the direction of achromatic color (for example, Japanese Patent Laid-Open No. 2005-238835). So, when a monochromatic image is printed using a pigment ink, it is possible to reverse the hue deviation toward the achromatic direction by overcoating the entire image with a yellow ink and at the same time printing another chromatic color ink.

However, to reverse the hue deviation toward the achromatic direction by applying an additional chromatic ink to an entire image already made yellowish by a relatively large amount of yellow ink requires applying an even greater amount of chromatic ink. In such a case, even a slight change in an ink ejection volume from an inkjet print head can greatly affect the hue balance, causing a hue that is outside the hue range permitted for the monochrome to be visibly observed by the viewer. Such an image impairment is hereinafter referred to as a "color rolling".

That is, in a construction for printing a monochromatic image, it has been difficult to solve the two problems—the aforementioned bronzing phenomenon and the color rolling—at the same time.

SUMMARY OF THE INVENTION

The present invention has been accomplished with a view to overcoming the problems described above. It is therefore an object of this invention to provide an image processor and an image processing method which are capable of suppressing the bronzing phenomenon and the color rolling and thereby producing high-quality monochromatic pictures in an inkjet printing apparatus.

The first aspect of the present invention is an image processing method for processing data for printing a monochrome image on a print medium using an achromatic ink and a plurality of chromatic inks, wherein the plurality of chromatic inks include a first chromatic ink having a hue component opposite that of the achromatic ink and a second chromatic ink having a reflection light with a hue component opposite that of a reflection light of the achromatic ink, the image processing method comprising the steps of: generating multivalued density data for the achromatic ink and the plurality of chromatic inks according to density levels; wherein the generating step does not generate the multivalued density data for the second chromatic ink in a density region with relatively low density levels but generates it in a density region with relatively high density levels; wherein, in at least the density region with relatively low density levels, the generating step generates multivalued density data for the first chromatic ink.

The second aspect of the present invention is an image processor for printing a monochrome image on a print medium using an achromatic ink and a plurality of chromatic inks, wherein the plurality of chromatic inks include a first chromatic ink having a hue component opposite that of the achromatic ink and a second chromatic ink having a reflection light with a hue component opposite that of a reflection light of the achromatic ink, the image processor comprising: a generating unit configured to generate multivalued density data for the achromatic ink and the plurality of chromatic inks according to density levels; wherein the generating unit does not generate the multivalued density data for the second chromatic ink in a density region with relatively low density levels but generates it in a density region with relatively high density levels; wherein, in at least the density region with relatively low density levels, the generating unit generates multivalued density data for the first chromatic ink.

Further features of the present invention will become apparent from the following description of exemplary embodiments (with reference to the attached drawings).

BRIEF DESCRIPTION OF THE DRAWINGS

FIG. 9 is a table showing the result of verification of the embodiment of this invention.

DESCRIPTION OF THE EMBODIMENTS

Figure 1:
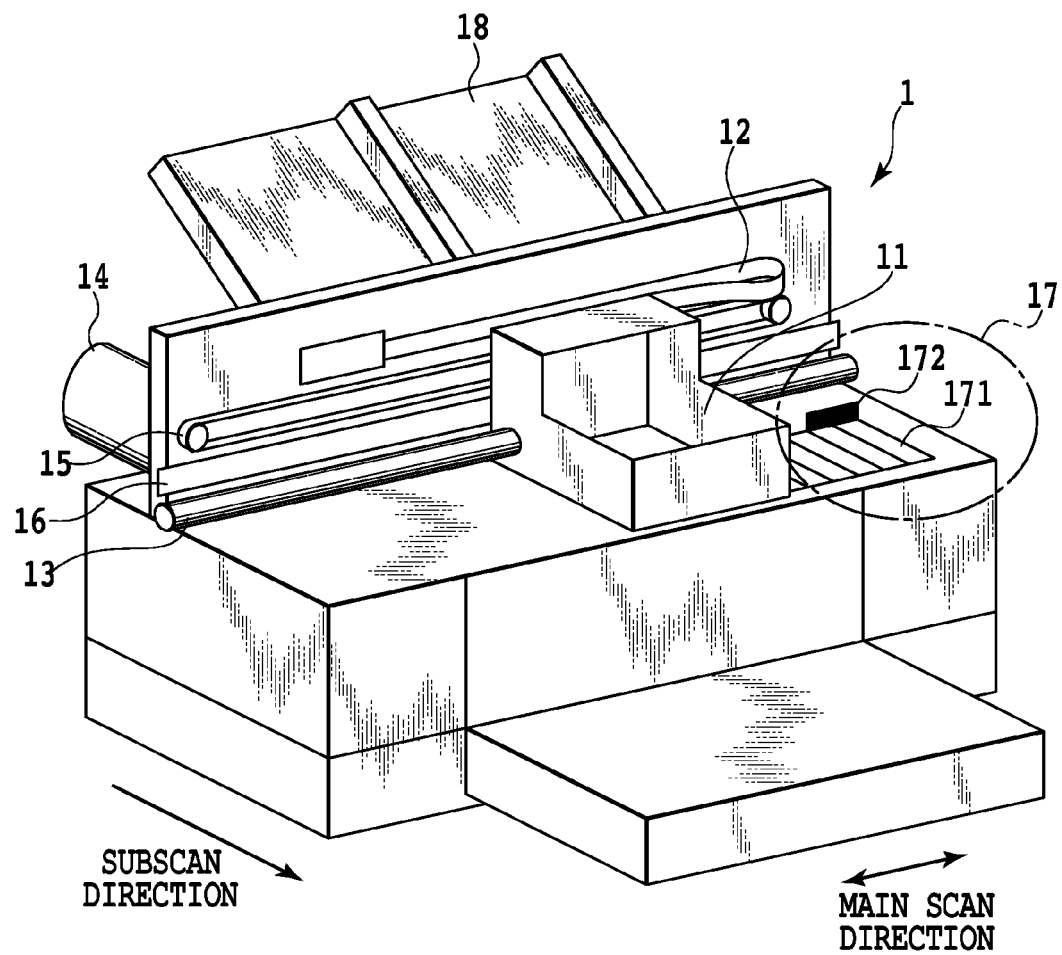
FIG. 1 is a schematic diagram showing a recording unit of an inkjet printing apparatus to which the present invention can be applied.

Now, some embodiments of this invention will be described in detail by referring to accompanying drawings.
(Embodiment 1)
(Composition of Inks)

First, an explanation will be given about components of pigment inks that may be used in the inkjet printing method of this invention and about the method of preparing them. In this embodiment, it is assumed that five pigment inks—black, cyan, magenta, yellow and green—are used. It is noted that "%" appearing in the following description is based on mass, unless otherwise specifically noted. Acetyleneglycol ethyleneoxide (EO) additive used is Acetylenol EH (Kawaken Fine Chemicals Co., Ltd).

<Yellow Ink>
(1) Preparing Dispersion Liquid
The following components are mixed.

| | |
|---|---|
| Pigment [C.I. Pigment yellow 74 (product name: Hansa Brilliant Yellow 5GX (Clariant make): | 10 parts |
| Anion high polymer P-1 [styrene/butyl acrylate/acrylic acid copolymer (copolymerization ratio (by weight) = 30/40/30), acid value of 202, weight-average molecular weight of 6500, water solution with 10% solid, neutralizer: potassium hydroxide]: | 30 parts |
| Deionized water: | 60 parts |

Next, the materials shown above are mixed in a batch type longitudinal sand mill (from Imex), which is then filled with 150 parts of zirconia beads 0.3 mm in diameter. These materials are water-cooled as they are dispersed for 12 hours. Further, this dispersion liquid is centrifuged to remove coarse particles. Then, as a final prepared material, a yellow dispersion liquid with about 12.5% solid and weight-average particle diameter of 120 nm is obtained. Using the yellow dispersion liquid thus obtained, inks are prepared as follows.

(2) Preparing Ink
The following ingredients are mixed and thoroughly stirred for dissolution and dispersion. They are filtered under pressure using Microfilter (of Fujifilm) with a pore size of 1.0 μm to prepare inks.

| | |
|---|---|
| Yellow dispersion liquid described above: | 40 parts |
| Glycerin: | 9 parts |
| Ethylene glycol | 6 parts |

-continued

| | |
|---|---|
| Acetylene glycol EO additive | 1 part |
| 1,2-hexanediol: | 3 parts |
| Polyethylene glycol (molecular weight: 1000): | 4 parts |
| Deionized water: | 37 parts |

<Magenta Ink>
(1) Preparing Dispersion Liquid

First, benzyl acrylate and methacrylic acid are used as ingredients to make AB type block polymer with an acid value of 300 and a number-average molecular weight of 2500 by a common method. This is then neutralized by a water solution of potassium hydroxide and diluted with deionized water to prepare homogeneous water solution of 50% by mass polymer.

One-hundred grams of the above polymer solution, 100 g of C.I. pigment red 122 and 300 g of deionized water are mixed and stirred mechanically for half an hour.

Next, a micro-fluidizer is used to pass this mixture through an interaction chamber five times under a liquid pressure of about 70 MPa. Then, the dispersion liquid thus obtained is centrifuged (at 12,000 rpm for 20 minutes) to remove undispersed substances containing coarse particles to produce a magenta dispersion liquid. This magenta dispersion liquid is assumed to have a pigment concentration of 10% by mass and a dispersant concentration of 5% by mass.

(2) Preparing Ink
In preparing an ink, the magenta dispersion liquid obtained as described above is used. To this the following ingredients are added so that the mixture has a desired concentration. These ingredients are thoroughly mixed and stirred and then force-filtered through a Microfilter (of Fujifilm) with a pore size of 2.5 μm to prepare a pigment ink with a pigment concentration of 4% by mass and a dispersant concentration of 2% by mass.

| | |
|---|---|
| Magenta dispersion liquid described above: | 40 parts |
| Glycerin | 10 parts |
| Diethylene glycol | 10 parts |
| Acetylene glycol EO additive | 0.5 part |
| Deionized water: | 39.5 parts |

<Cyan Ink>
(1) Preparing Dispersion Liquid

First, benzyl acrylate and methacrylic acid are used as ingredients to make AB type block polymer with an acid value of 250 and a number-average molecular weight of 3000 by a normal method. This is then neutralized by a water solution of potassium hydroxide and diluted with deionized water to prepare homogeneous polymer aqueous solution of 50% by mass polymer.

One hundred and eighty grams of the above polymer solution, 100 g of C.I. pigment blue 15:3 and 220 g of deionized water are mixed and stirred mechanically for half an hour. Next, a micro-fluidizer is used to pass the mixture through an interaction chamber five times under a liquid pressure of about 70 MPa.

Further, the dispersion liquid thus obtained is centrifuged (at 12,000 rpm for 20 minutes) to remove undispersed substance containing coarse particles to make a cyan dispersion liquid. This cyan dispersion liquid is assumed to have a pigment concentration of 10% by mass and a dispersant concentration of 10% by mass.

(2) Preparing Ink

In preparing an ink, the cyan dispersion liquid obtained as described above is used. To this the following ingredients are added so that the mixture has a desired concentration. These ingredients are thoroughly mixed and stirred and then force-filtered through a Microfilter (of Fujifilm) with a pore size of 2.5 µm to produce a pigment ink with a pigment concentration of 2% by mass and a dispersant concentration of 2% by mass.

| | |
|---|---|
| Cyan dispersion liquid described above: | 20 parts |
| Glycerin | 10 parts |
| Diethylene glycol | 10 parts |
| Acetylene glycol EO additive | 0.5 part |
| Deionized water: | 53.5 parts |

<Black Ink>
(1) Preparing Dispersion Liquid

| | |
|---|---|
| Carbon black: | 10 parts |
| Resin : | 5 parts |
| Water: | 85 parts |

The mixture liquid of the above composition is dispersed at 1,500 rpm for 5 hours using a sand mill of Kaneda Riken Kogyo K.K. to obtain a carbon black dispersion liquid 1 (with a carbon black content of 10% by mass). The dispersion condition of the sand mill is: a zirconia bead diameter of 0.6 mm and a pot filling factor of 70%. For the carbon black, Black Pearls 1100 (from Cabot in U.S.) is used. The resin used is a styrene-acryl resin with a copolymerization ratio of 70:30, a weight-average molecular weight of 8,000 and an acid value of 170, neutralized by the amount of potassium hydroxide equivalent to the acid value.

(2) Preparing Ink

In preparing an ink, the black dispersion liquid obtained as described above is used. To this the following ingredients are added so that the mixture has a desired concentration. These ingredients are thoroughly mixed and stirred and then force-filtered through a Microfilter (of Fujifilm) with a pore size of 2.5 µm to produce a pigment ink.

| | |
|---|---|
| Black dispersion liquid described above: | 18 parts |
| Glycerin | 7 parts |
| Triethylene glycol | 5 parts |
| Polyethylene glycol 1000 | 3 parts |
| Acetylene glycol EO additive | 1 part |
| Deionized water: | 66 parts |

<Green Ink>
(1) Preparing Dispersion Liquid

One hundred and eighty grams of aluminum chloride and 42 g of sodium chloride are heated at 160° C. for 5 hours in a reactor, that has a halogen gas introducing tube, as they are mixed by a stirrer. Then, after two hours of stirring, the temperature is set at 100° C. and 60 g of copper phthalocyanine is added. Further, to this reactor are introduced chlorine gas and bromine gas, 10 to 1, at a flow speed of 9 g/h to halogenate copper phthalocyanine. A substance produced is discharged into water, cleaned and dried to obtain 80 g of green pigment.

Fifteen parts of the above-described green pigment, 7.5 parts of dispersant and 77.5 parts of deionized water are mixed to produce a pigment solution. For the dispersant, a resin A is used which is formed by neutralizing with a potassium hydroxide water solution an AB type block polymer having an acid value of 250 and a weight-average molecular weight of 6,000, which is synthesized by a common method using benzyl methacrylate and methacrylic acid as ingredients. This pigment solution is loaded into a batch type longitudinal sand mill (Imex make), which is then supplied with 85 parts of 0.3-mm zirconia beads. They are dispersed for three hours while being cooled. After this, the mixture is centrifuged to remove undispersed substances containing coarse particles. It is then filtered under pressure through Microfilter (of Fujifilm) with a pore size of 3.0 µm to prepare a green pigment dispersion body with a (solid) pigment content of 10% by mass and a resin content of 5% by mass.

(2) Preparing Ink

In preparing an ink, the green dispersion liquid obtained as described above is used. To this the following ingredients are added so that the mixture has a desired concentration. These ingredients are thoroughly mixed and stirred and then force-filtered through a Microfilter (of Fujifilm) with a pore size of 2.5 µm to produce a pigment ink.

| | |
|---|---|
| Green dispersion liquid described above: | 40 parts |
| Glycerin | 7 parts |
| Diethylene glycol | 5 parts |
| Polyethylene glycol 1000 | 5 parts |
| Acetylene glycol EO additive | 1 part |
| Deionized water: | 41 parts |

(Overall Configuration)

FIG. 1 is a schematic view showing a printing unit of an inkjet printing apparatus 1 applicable to the present invention. A carriage 11 can be driven in a main scan direction along a guide shaft 13, on which it is supported and guided, by a drive force transmitted through a timing belt 15 from a main scan motor 14. The carriage 11 is connected with a flexible cable 12, that can follow the movement of the carriage 11, and has a connector holder to transmit a signal from the flexible cable 12 to a print head mounted on the carriage 11 (the print head is not shown in FIG. 1). A drive signal issued by a print control unit of the printing apparatus body is sent through the flexible cable 12 and the connector holder to the print head on the carriage 11.

The carriage 11 is also mounted with an encoder sensor to read an encoder scale 16 extending in the main scan direction so that the present position and speed of the carriage 11 can be managed.

At one end of a range of movement of the carriage 11 there is provided a recovery means 17 to execute a maintenance operation on the print head. The recovery means 17 has a cap 171 for hermetically sealing a nozzle face of the print head during a suction-based recovery operation and for protecting it when the print head is not used, and a wiper blade 172 for wiping clean the nozzle face of the print head.

Figure 2:
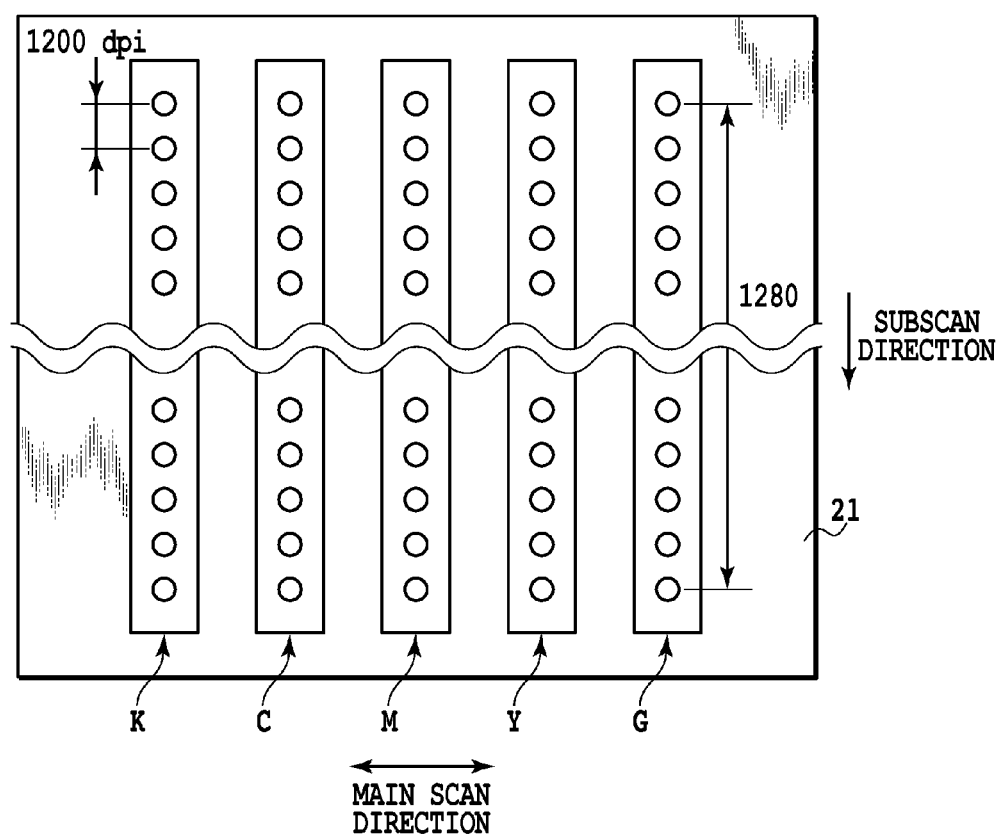
FIG. 2 is a schematic diagram showing arrays of nozzles as viewed from a nozzle face side of a print head.

FIG. 2 is a schematic diagram showing arrays of nozzles when the print head 21 of this embodiment mounted on the carriage 11 is seen from its nozzle face. The print head 21 has six nozzle arrays 21K-21G for black, cyan, magenta, yellow and green inks parallelly arranged in the main scan direction as shown. In each nozzle array, 1,280 nozzles are arranged in the sub-scan direction at a pitch of 1,200 dpi (dots/inch).

Inside the individual nozzles there extends an ink path that introduces ink to the associated nozzle, with an electrothermal transducer or heater to produce thermal energy in response to a drive signal embedded in the ink path. According to the drive signal received from the print control unit, a pulse voltage is applied to the electrothermal transducer which produces a film boiling in the ink near it, causing the pressure of an air bubble produced to eject an ink droplet from each of the nozzles. In this embodiment, the print head ejects about 4.5 pl of ink from each of the nozzles.

Referring again to FIG. 1, when printing is done, a print medium such as paper and thin plastic sheets is separated, one sheet at a time, from a feed tray 18 and supplied by a feed roller not shown into the printing apparatus until the front end of the print medium is set at a position where the print head mounted on the carriage 11 can perform printing. Then, the print head 21 ejects ink in response to the drive signal as the carriage 11 travels in the main scan direction, which is called a printing scan.

This is followed by a print medium conveyance operation in which the print medium is conveyed in the sub-scan direction by a distance corresponding to the printing width of the print head. The printing scan and the print medium conveyance operation are alternated repetitively to form an image progressively on the print medium at a print resolution of 1,200 dpi.

Figure 3:
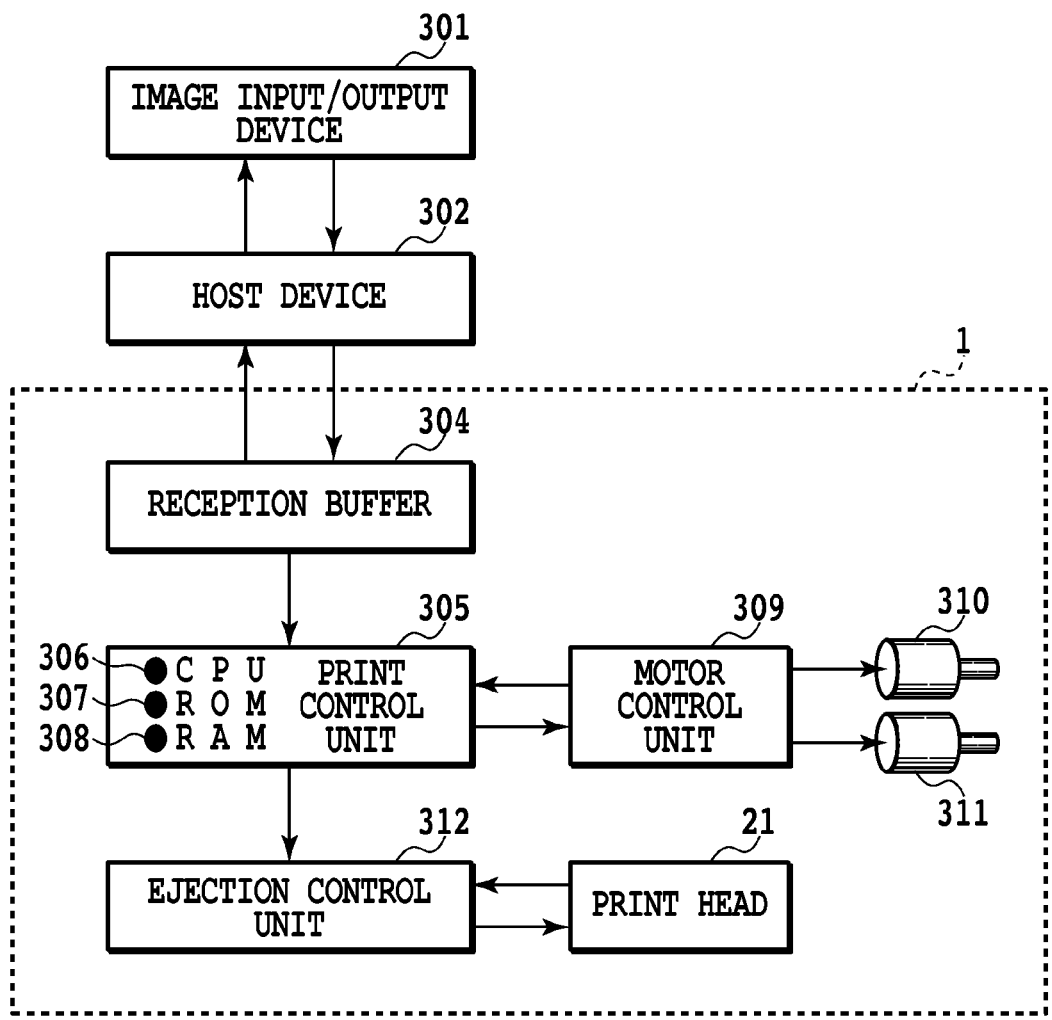
FIG. 3 is a block diagram showing a configuration of a control system in the inkjet printing apparatus.

FIG. 3 is a block diagram showing a configuration of the control system in the inkjet printing apparatus 1. A host device 302 connected externally is connected with an image input/output device 301, such as scanner and digital camera, and processes image data received from it before transferring the image data in the form of RGB multivalued signal to the printing apparatus 1. The host device 302 may be a computer as information processing device or an image reader.

The multivalued RGB data received from the host device 302 is temporarily stored and accumulated in a reception buffer 304 in the printing apparatus.

The print control unit 305 has a CPU 306, a ROM 307 storing a control program, and a RAM 308 which serves as a work area when performing a variety of image processing. The print control unit 305, according to the control program stored in the ROM 307, processes image data stored in the reception buffer 304 and performs various controls on the entire printing apparatus. For example, it executes image processing characteristic of this invention on the multivalued RGB image data stored in the reception buffer 304 to create CMYKG binary data that the print head can use for printing. Then, according to the binary data thus obtained, the print control unit 305 controls an ejection control unit 312 to cause the print head 21 to eject ink. The print control unit 305 also performs control, through a motor control unit 309, on a carriage motor 310 for moving the carriage 11 in the main scan direction and a conveyance motor 311 for conveying the print medium in the sub-scan direction.

Figure 4:
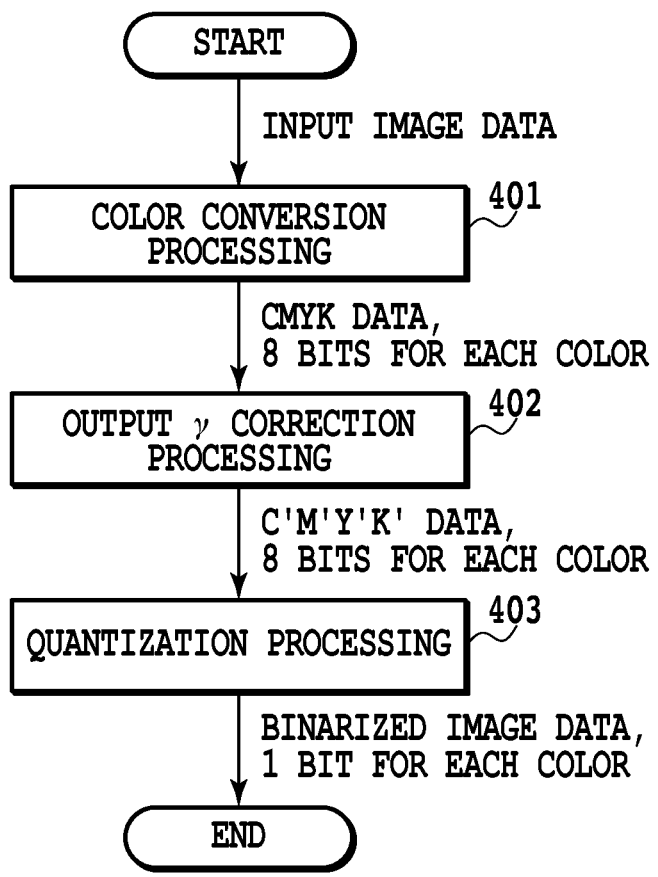
FIG. 4 is a block diagram showing a flow of image processing executed by the print control unit.

FIG. 4 is a block diagram showing the flow of image processing executed by the print control unit. The print control unit 305 performs color conversion processing 401 on the multivalued RGB data (brightness data) stored in the reception buffer 304 to create multivalued density data for ink used in the printing apparatus of the embodiment. For a color image, the color conversion processing converts the multivalued RGB data into multivalued density data for four colors—cyan, magenta, yellow and black. In the case of a monochrome image, input achromatic multivalued data is in this embodiment converted into multivalued density data for five colors—cyan, magenta, yellow, black and green.

Generally the color conversion processing, including this embodiment, performs two kinds of processing—brightness/density conversion processing and color separation processing—in a single operation using LUT. The brightness/density conversion processing involves converting the input RGB brightness data into density data of CMY, which is complementary color to the RGB, reversing the relation in signal magnitude. The color separation processing involves correcting the density data obtained as a result of the brightness/density conversion to create density data for each color so that the printing apparatus can print image data using actual inks.

In the inkjet printing apparatus, the actual inks do not necessarily have appropriate hues of cyan, magenta, yellow and black in the a*b* space. So, to express the colors corresponding to the density data obtained as a result of the brightness/density conversion processing by using the real inks, the color separation processing has a function of creating the density data for each color ink with good balance.

Although the color conversion processing 401 includes two phases of operation, it actually performs a one-time signal value conversion by referring to a lookup table (LUT) stored in the ROM 307 in advance. More specifically, a set of 256-grayscale-level RGB brightness data in each pixel is converted into a set of 256-grayscale-level CMYKG density data. In the case of a color image, the LUT is a three-dimensional table that offers a conversion from brightness data for R (red), G (green) and B (blue) to multivalued density data for C (cyan), M (magenta), Y (yellow) and K (black). In the case of a monochrome image, the LUT is a one-dimensional table that offers a conversion from achromatic multivalued brightness data to C (cyan), M (magenta), Y (yellow), K (black) and G (green).

The CMYKG multivalued image data that has undergone the color conversion is then subjected to output γ correction processing 402 which performs a signal value conversion so that the density represented on the print medium will be linear with respect to an input signal. More specifically, by referring to a one-dimensional lookup table prepared for each ink color that is stored in the ROM 307 in advance, the output γ correction processing 402 converts 256-grayscale-level density data CMYKG in each pixel into 256-grayscale-level density data C'M'Y'K'G'.

The 256-grayscale-level density data C'M'Y'K'G' output from the output γ correction processing 402 is further converted by a quantization processing 403 into binary data of 1 (print) or 0 (not print) for each color. As the method of quantization, a known error diffusion method and a dithering method may be applied. Then, the print control unit 305 causes, through the ejection control unit 312, the print head 21 to eject ink from its nozzles according to the binary data obtained by the quantization processing 403.

As for the LUTs that are referenced in the color conversion processing 401 and the output γ correction processing 402, it is common practice to prepare LUTs separately for a color image and a monochrome image and also different LUTs for different print modes based on the kind of print medium. Further, while the LUTs may be configured such that the CMYKG multivalued data is prepared on one-to-one for all sets of 256-grayscale-level RGB data, the LUTs may have only discrete conversion data stored therein. In that case, CMYKG multivalued data can be calculated by interpolating a plurality of pieces of converted data stored in the LUT.

(Characteristic Configuration)

In the construction of the printing apparatus described above, this embodiment makes characteristic the color conversion processing 401 performed in printing a monochrome image in order to reduce both the color rolling and the bronzing phenomenon.

Figure 5:
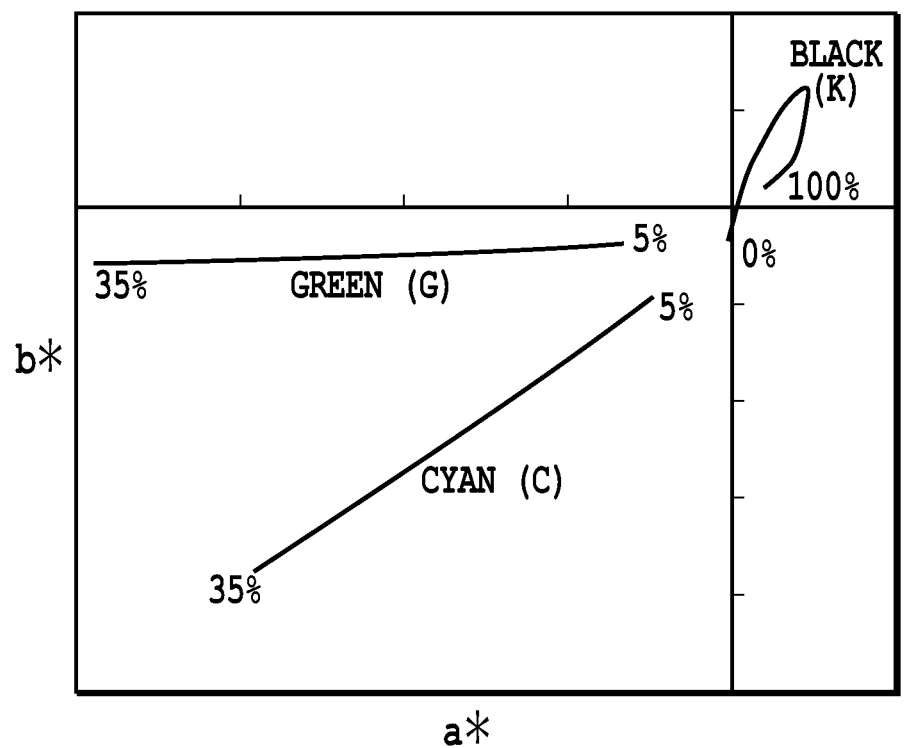
FIG. 5 is a graph showing a result of measurement, over a range of print duty, of hue and chroma of black, cyan and green inks used in an embodiment of this invention.

FIG. 5 is a graph showing a result of measurement of hue and chroma as related to a print duty when black, cyan and green inks used in this embodiment are printed on a print medium. The measurement of hue is made by a spectrometer available on the market (Spectro Lino by Gretag Macbeth)

and the result of measurement is represented on the a*b* plane. The print duty is a ratio of the number of printed dots to the number of pixels in a predetermined area made up of a plurality of pixels, minimum unit areas in each of which one dot is allowed to be printed.

As for cyan and green inks, the figure shows the measurements of hue and chroma for a print duty of between 5% and 35%. It is seen that the chroma increases as the print duty increases. On the other hand, as for black ink, the graph shows the measurements for a print duty of between 0% and 100%. It is seen that in a low duty range the black ink is nearly achromatic but that in a region of around 50% duty the chroma in the direction of yellow peaks and, in a higher density region, progressively decreases.

To print a monochrome image with an appropriate gray balance by using such a black ink, it is desired that the kind and quantity of chromatic inks to be additionally printed be adjusted according to the grayscale level in a way that suppresses the chroma of yellow. In the example of FIG. 5, a cyan ink, that has a component countering the hue deviation in the direction of yellow, is preferably applied.

Figure 8:
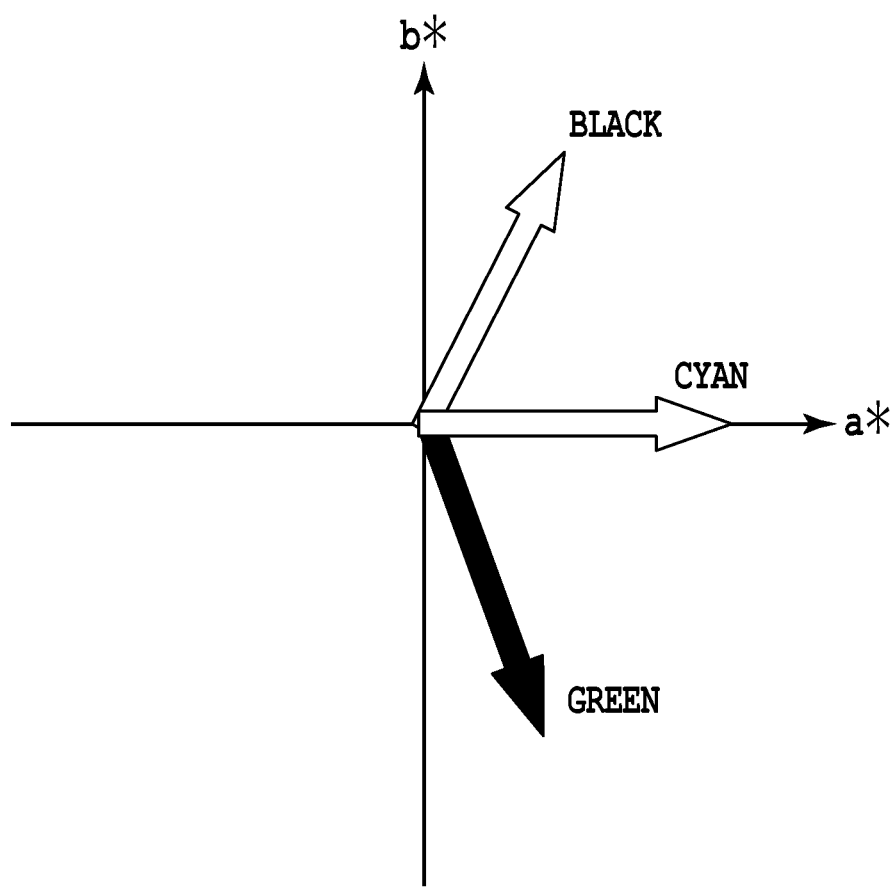
FIG. 8 is a result of measurement of hues of reflected lights of black, cyan and green inks used in the embodiment of this invention.

FIG. 8 shows a measurement of hue of a reflected light from an image with a 100% print duty that has been formed by printing black, cyan and green inks, all used in this embodiment, on a print medium. A measurement of reflected light is made by using a spectral irradiance meter available on the market (CS-1000A: Konica Minolta) and the result of measurement is shown on the a*b* plane. As already explained, the bronzing phenomenon tends to produce a complementary color of the original color of a pigment, so the green ink exhibits a violet hue and the cyan ink a red hue. The specularly reflected light of the black ink exhibits a yellow hue. In the following description, the color of a specularly reflected light of a white light, when affected by the bronzing, is called a bronzed color.

To suppress the bronzing phenomenon in a monochrome image using a black ink with the characteristic of FIG. 8, it is desired that a chromatic ink exhibiting a bronzed color that suppresses the bronzed yellow color be used for printing. In the example of FIG. 8, in suppressing the bronzed color of a black ink, a bronzed color of green ink (violet) can be expected to produce a greater effect of bringing the b* direction component close to 0 than a bronzed color of cyan ink (red).

As described above, in the case of a pigment black ink, a preferred ink color to correct hue deviations and a preferred ink color to correct the bronzing phenomenon often differ.

Figure 6:
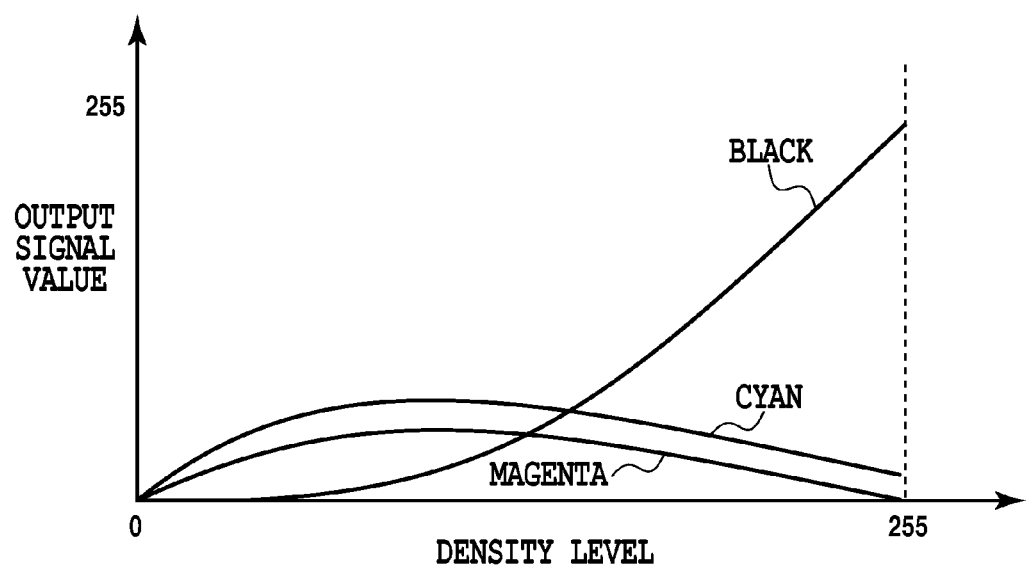
FIG. 6 is a graph showing a signal value conversion performed during color separation processing intended to suppress hue deviations.

FIG. 6 shows how the signal values are converted during the color separation processing intended to suppress hue deviations when a monochrome image is printed using the black shown in FIG. 5. In the figure, the abscissa represents a density level of multivalued density data following the brightness-density conversion. The greater the level, the higher the density. The ordinate on the other hand represents 256-level multivalued data of black, cyan and magenta output from the color separation processing for the corresponding density level. The magnitude of the output signal corresponds to the number of dots actually printed in a predetermined area of a print medium. This example of color conversion processing represents a case where cyan and magenta inks are used to correct the hue of the monochrome image.

The diagram shows that, in a low density region where graininess tends to stand out easily, a black ink is not used and instead cyan and magenta are used to express gray. From a density level where the graininess hardly stands out, the black ink begins to be used. In a medium density region where the hue of the black ink deviates in the direction of yellow, the signal values of cyan and magenta become maximum. After this, as the density level increases, the signal value of black also increases, with cyan and magenta progressively decreasing in signal value.

However, with the method of FIG. 6 that applies a cyan ink in a volume slightly greater than normal, when a black ink having a bronzed color characteristic such as shown in FIG. 8 is used, it cannot be expected to produce the effect of reducing the bronzing phenomenon. In a high density region, yellow, which is a bronzed color of the black ink, and red, which is a bronzed color of the cyan ink, may mix together through the additive color mixing to produce a bronzed color with a strong red-brown hue, giving the printed image a strange impression. That is, with the color separation processing shown in FIG. 6, it is not possible to reduce the bronzing phenomenon that is characteristic of pigment inks, though the hue deviation may be suppressed.

In the case of FIG. 8, to suppress the bronzing phenomenon it is effective to print a green ink rather than the cyan ink. Because, by the additive color mixing of violet which is bronzed color of green and yellow, the hue of a bronzed color become closer to white (achromatic color), making the bronzing phenomenon less distinctive.

Figure 10:
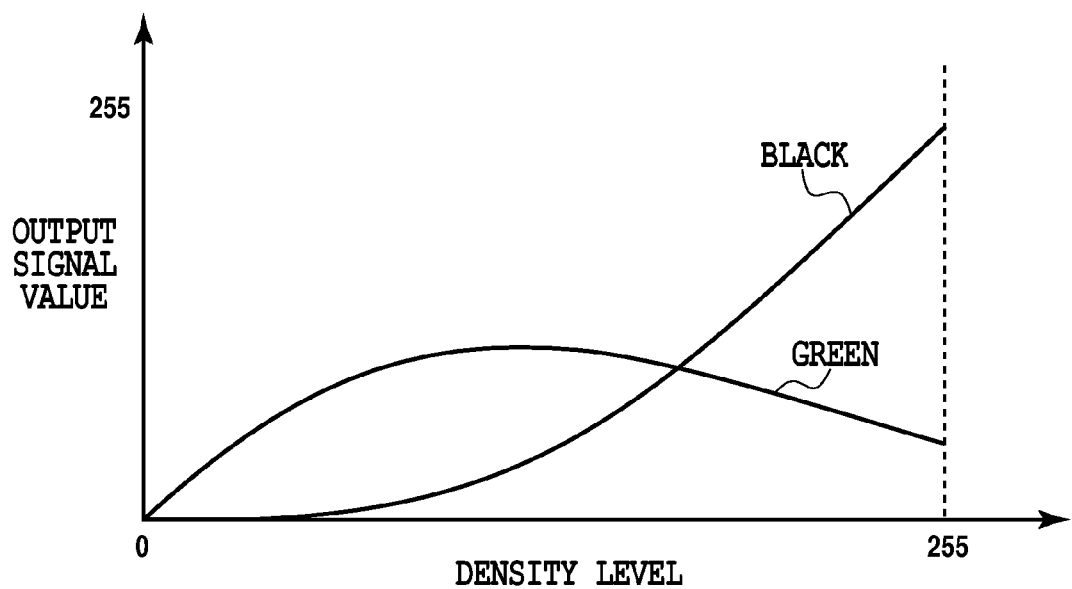
FIG. 10 is a graph showing a signal value conversion during color separation processing intended to suppress a bronzing phenomenon.

However, if the green ink is positively used over an entire range of grayscale level, as shown in FIG. 10, including a low density region where a graininess easily stands out and a medium density region where a hue deviation is easily recognized, a concern arises that a color rolling may become more serious than when the cyan ink is used. The reason is that, referring again to FIG. 5, the color component of the green ink in the −b* direction is smaller than that of the cyan ink, too weak to suppress the hue deviation of the black ink, making it necessary to print a greater volume of green ink than when cyan ink is used.

As a result of our vigorous studies, the inventors of this invention have focused our attention on the fact that the hue deviation problem arises mainly in a low to medium density region and that the bronzing phenomenon occurs mainly in a high duty region. To make both the hue deviation and the bronzing phenomenon unrecognizable over the entire density regionentire density region, we have found that it is effective to print a chromatic ink highly capable of correcting hue deviations in a low to medium density region and, in a high density region, print a chromatic ink highly capable of suppressing the bronzing phenomenon. So, in this embodiment, in a low to medium density region a cyan ink is used to correct hue deviations and, in a high density region, a green ink is used to suppress bronzing phenomenon.

Figure 7:
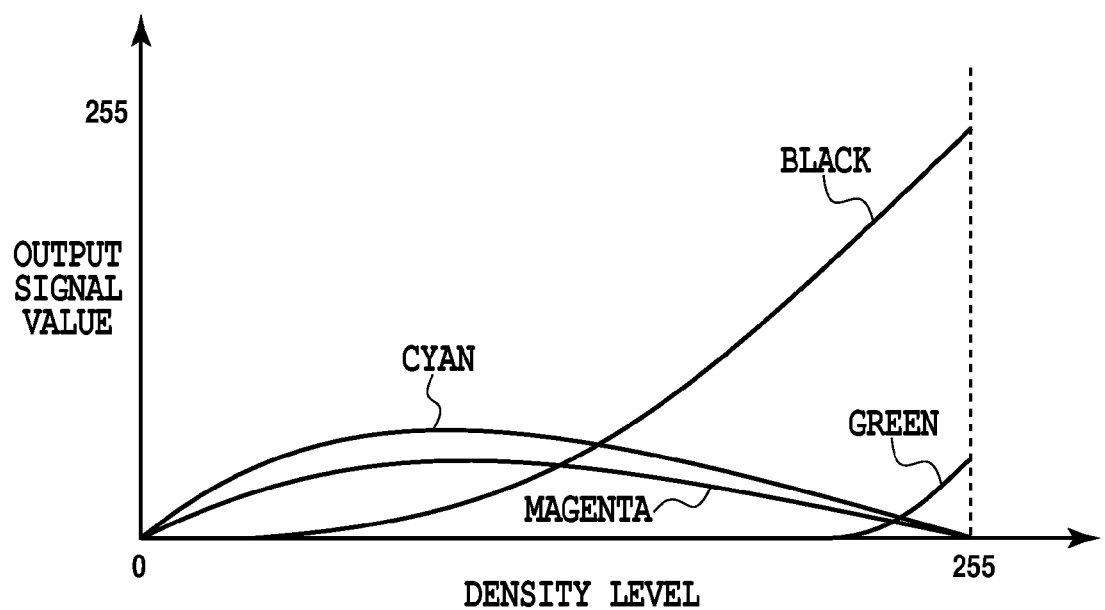
FIG. 7 is a graph showing a signal value conversion during color separation processing intended to suppress both hue deviations and a bronzing phenomenon.

FIG. 7 shows a signal value conversion during the color separation processing in this embodiment implemented to suppress both the hue deviation and the bronzing phenomenon. In a low to medium density region where the hue deviation tends to be more distinctive than the bronzing phenomenon, the color separation processing of this embodiment uses more of cyan and magenta ink than green ink to correct a hue of a monochrome image. In a high density region where the bronzing phenomenon tends to be more prominent than the hue deviation, more of green ink is used than cyan and magenta ink to suppress the bronzing. The output signal value for any of ink colors—green, cyan or magenta ink—is changed continuously and smoothly according to the grayscale level to make sure that the magnitude relationship between the output signal values of green ink and cyan ink or magenta ink is naturally reversed according to the grayscale level. In this embodiment, the output signal value for green ink at the maximum grayscale level of 255 is around 35, about 15%.

It is noted that while the bronzing phenomenon is suppressed more effectively as the output signal value for green ink becomes large, too large an output signal value will adversely affect the hue of a monochrome image. It is therefore preferred that the output signal value for green ink (chromatic ink) at the maximum grayscale level be adjusted in a range that makes both the bronzing phenomenon and the hue deviation hardly distinctive. Where inks of the above components are used, the amount of green ink applied should preferably be smaller than 40% of that of black ink.

As described above, this embodiment can appropriately suppress both the hue deviation and the bronzing phenomenon in a monochrome image by executing the color separation processing, such as shown in FIG. 7.

(Evaluation)

In the following we will explain verification tests and their results.

In this verification, a serial type inkjet printing apparatus shown in FIG. 1 to FIG. 3 was used to print a plurality of black patches one for each of a plurality of grayscale levels at a resolution of 1200 dpi. These patches were printed by a 16-pass, bidirectional multipass printing. The ink ejection volume was 4.5 pl and a print medium used was glossy paper of Canon make (product name: "Premium Glossy Paper (Thick)").

For comparison of this embodiment with the conventional construction, a plurality of patches one for each of a plurality of grayscale levels were printed according to each of the color separation processing shown in FIG. 6, FIG. 7 and FIG. 10. FIG. 6 shows color separation processing where only cyan and magenta ink were used as chromatic inks in the entire density region in order to correct hue deviations in a monochrome image. A result of this color separation processing is presented as a comparison example 1. FIG. 10 shows color separation processing that uses only green ink as a chromatic ink in the entire density region in order to reduce the bronzing phenomenon in a monochrome image. A result of this color separation processing is presented as a comparison example 2. FIG. 7 shows color separation processing that uses cyan, magenta and green ink as chromatic inks to reduce both the hue deviations and the bronzing phenomenon in a monochrome image. A result of this color separation processing is presented as an embodiment example.

Then for each of the above three cases of color separation processing, the bronzed colors of the patches at the grayscale level of 255 was measured using a spectral irradiance meter available on the market (CS-1000A: Konica Minolta) and visual quality of these patches as a black color was evaluated. Hues of patches were compared also among different grayscale levels to evaluate the color rolling (hue deviation).

FIG. 9 shows the result of measurement and visual check.

The result of measurement of bronzed colors indicates that, in the embodiment example and comparison example 2 that use green ink, the b* component in particular has decreased when compared with the comparison example 1 that uses cyan ink, suppressing the chroma of the bronzed color.

Regarding a visual quality as a black, it is found that the patches in the embodiment example and the comparison example 2 exhibit an appropriate black when compared with the comparison example 1 in which the addition of cyan ink resulted in a bronzed color of red-brown being observed.

As for color rolling, in the comparison example 2 in which the percentage of a chromatic color ink applied is larger than that of black ink, there is a greater concern (degree) of color rolling.

From the result described above, it is verified that the method of the embodiment example employing the color separation processing of FIG. 7 is satisfactory in all respects—bronzing phenomenon, visual quality of black color and color rolling phenomenon.

As described above, this embodiment suppresses hue deviations when printing a monochrome image, by applying a greater volume of cyan ink than green ink in a low to medium density region. In a high density region the green ink is applied in greater volume than cyan ink to suppress the bronzing phenomenon. This method therefore can produce a high-quality monochrome image with hardly observable hue deviations and bronzing phenomenon in the entire density region.

(Other Embodiments)

Inks applicable to this invention are not confined to those of compositions shown in the above embodiment and any ink can be applied as long as they are a combination of black ink and a plurality of color inks. In the above embodiment, although the colorants contained in inks have been described to be pigments, this invention effectively works also for dye inks when the bronzing phenomenon is observed distinctively.

While the above embodiment has taken up an example case where cyan and magenta inks are used to correct hues in a monochrome image and green ink to correct a bronzing phenomenon, this invention is not limited to this example. Depending on the kind of print medium and components of inks, the hue of black ink may be situated in a direction different from that of FIG. 5 and the bronzed color of black ink may have a direction different from that of FIG. 8. In such cases, based on individual hue components of the hue deviation and the bronzing color, one or more of inks having components that corrects them are chosen and the chosen ink are used in an appropriate ratio.

For example, where the bronzed color of black ink has a chroma in the −b* direction, red ink rather than green ink is more suited for suppressing the bronzing phenomenon in a high density region. Further, where the hue of black ink changes according to the grayscale level (density region) even in a low to medium density region, chromatic inks to correct hue deviations may be changed according to the grayscale level. In either case, in a low to medium density region with relatively low density levels, one or more chromatic inks (first chromatic ink) having a color component opposite the hue of black ink need to be used. At the same time, in a high density region with relatively high density levels, one or more chromatic inks (second chromatic ink) having a bronzed color component opposite the bronzed color of black ink need to be printed. By adjusting the first chromatic ink and the second chromatic ink according to the density level during the process of printing, the effect of this invention can be produced.

Although in the foregoing, an example case has been described where mainly one kind of black ink is used in printing a monochrome image, it is also possible to prepare a plurality of achromatic inks with different grayscale levels, such as gray ink and light gray ink, and make hue deviation correction for each ink. With this method, since dots of gray ink are less prominent than those of black ink, it is possible to minimize the printing of chromatic inks thereby reducing the color rolling in the low to medium density region.

Further in the above embodiment, an example case has been described to have electrothermal transducer embedded one in each of individual nozzles. The present invention is not confined to this kind of inkjet printing head. The energy generating means for ejecting ink may, for example, be a piezoelectric element installed in each of nozzles.

Further, in the above example the chroma of the hue of black ink is made close to 0 to print a monochrome image with as completely achromatic as possible. This invention is also not limited to this configuration. In recent years printing apparatus are available on the market which let the user select between a monochrome image with an overall slightly blue-tinted, cold black tone and one with a reddish, warm black tone according to his or her preference. Even with such a printing apparatus, the effect of this invention can be produced as long as one or more chromatic inks other than black ink is printed in an appropriate volume in a low to medium density region in order to adjust to a target hue.

Further, while in the above embodiment, the color conversion processing has been described to execute the brightness-density conversion and the color separation in one operation by using a prepared LUT, this invention is not limited to this configuration. The effect of this invention can be obtained as long as the conversion processing shown in FIG. 7 (i.e., processing that prints a hue-correcting chromatic ink in a low to medium density region and a bronzing phenomenon-suppressing chromatic ink in a high density region). This configuration is also included in the scope of this invention. For example, a configuration may be adopted which calculates density data of chromatic ink from black data by using a conversion formula with a parameter defined which can realize a profile shown in FIG. 7.

Further in the above embodiment, an image processor has been described which has installed in the inkjet printing apparatus the print control unit 305 that performs processing characteristic of this invention. The print control unit 305, however, does not need to be provided in the inkjet printing apparatus. For example, the function of the print control unit 305 may be given to a printer driver of the host device 302 connected to the inkjet printing apparatus. In that case, the printer driver executes a series of operations shown in FIG. 4 based on multivalued brightness data and then supplies binary data generated to the printing apparatus. As can be seen from the above, an inkjet printing system including a host device and an inkjet printing apparatus is also within the scope of this invention. In this case, the host device works as an image processor that generates data to be supplied to the inkjet printing apparatus.

That is, the feature of this invention lies in the data processing executed by the print control unit 305. Therefore, the image processor with the print control unit 305 designed to execute the data processing characteristic of this invention falls in the scope of this invention. If the print control unit 305 is provided in the inkjet printing apparatus, the inkjet printing apparatus functions as the image processor of this invention. If the print control unit 305 is provided in the host device, the host device works as the image processor of this invention.

Further, computer-readable programs for a computer to execute the characteristic data processing described above and a storage medium in which to store the programs so that they can be read by the computer also fall in the scope of this invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-284027, filed Dec. 15, 2009, which is hereby incorporated by reference herein in its entirety.

What is claimed is:

1. An image processing method for printing a monochrome image on a print medium, the image processing method comprising:

an obtaining step for obtaining density levels indicated by the monochrome image; and a determining step for determining an amount of an achromatic ink to be applied and an amount of a chromatic ink to be applied according to the density levels obtained by the obtaining step, wherein, in an a*–b* plane, a sign indicating plus or minus of b* component of a first measurement result that is obtained by measuring specular reflected light of an image for which only the achromatic ink is applied at a predetermined duty, is opposite from the sign indicating plus or minus of b* component of a second measurement result that is obtained by measuring specular reflected light of an image for which only the chromatic ink is applied at the predetermined duty.

2. An image processing method according to claim 1, wherein the achromatic ink and the chromatic inks include a pigment as a coloring material.

3. An image processing method according to claim 1, wherein the chromatic ink is a green ink.

4. An image processing method according to claim 1, wherein a plurality of achromatic inks with different densities of a coloring material contained are able to be used as the achromatic ink.

5. An image processing method according to claim 1, wherein the sign of b* component of the first measurement result is plus and the sign of b* component of the second measurement result is minus.

6. An image processing method according to claim 1, wherein in the determining step, the amount of the achromatic ink to be applied and the amount of the chromatic ink to be applied are determined according to data that relates the density levels obtained by the obtaining step to the amount of the achromatic ink to be applied and the amount of the chromatic ink to be applied.

7. An image processing method according claim 1, wherein, in the determining step, the amount of the chromatic ink to be applied is determined such that the density levels are higher the amount of the chromatic ink to be applied is larger.

8. An image processing method according to claim 1, wherein, in a case where the density levels obtained by the obtaining step is a predetermined level, in the determining step, the amount of a second chromatic ink having a different hue from the chromatic ink to be applied, is determined to be larger than zero; and wherein, in an a*–b* plane, an absolute value of b* component of the second measurement result is larger than an absolute value of b* component of a third measurement result that is obtained by measuring specular reflected light of an image for which only the second chromatic ink is applied at the predetermined duty.

9. An image processing method according claim 8, wherein, in a case where the density levels obtained by the obtaining step is the predetermined level, the determining is performed such that the amount of the chromatic ink to be applied is smaller than the amount of the second chromatic ink to be applied.

10. An image processing method according to claim 8, wherein, in a case where the density levels obtained by the obtaining step is the predetermined level, the determining is performed such that the amount of the chromatic ink to be applied is zero and amount of the achromatic ink to be applied and the amount of the second chromatic ink to be applied is larger than zero.

11. An image processing method according claim 8, wherein the second chromatic ink is cyan ink.

12. An image processing method according to claim 11, wherein, in a case where the density levels obtained by the obtaining step is the predetermined level, the determining is performed such that an amount of a third chromatic ink, having a different hue from the chromatic ink and the second chromatic ink, to be applied is larger than zero.

13. An image processing method according to claim 12, wherein the third chromatic ink is a magenta ink.

14. An image processing method according claim 8, wherein a hue indicated by the third measurement result is closer to a hue indicated by the first measurement result than a hue indicated by the second measurement result.

15. An image processing method according to claim 14, wherein the sign of b* component of the fourth measurement result is plus and the sign of b* component of the fifth and sixth measurement results are minus.

16. An image processing method according to claim 8, wherein, in the a*-b* plane, a sign of b* component of a fourth measurement result that is obtained by using a spectral irradiance meter to measure an image for which only the achromatic ink is applied at a predetermined duty, is opposite from the sign of b* component of a fifth measurement result that is obtained by using the spectral irradiance meter to measure an image for which only the chromatic ink is applied at the predetermined duty, and wherein, in the a*-b* plane, a sign of b* component of a sixth measurement result that is obtained by using the spectral irradiance meter to measure an image for which only the second chromatic ink is applied at a predetermined duty, is opposite from the sign of b* component of the fourth measurement result.

17. An image processor for printing a monochrome image on a print medium comprising:

an obtaining unit configured to obtain density levels indicated by the monochrome image; and a determining unit configured to determine an amount of an achromatic ink to be applied and an amount of a chromatic ink to be applied according to the density levels obtained by the obtaining unit, wherein, in an a*-b* plane, a sign indicating plus or minus of b* component of a first measurement result that is obtained by measuring specular reflected light of an image for which only the achromatic ink is applied at a predetermined duty, is opposite from the sign indicating plus or minus of b* component of a second measurement result that is obtained by measuring specular reflected light of an image for which only the chromatic ink is applied at the predetermined duty.

18. A non-transitory computer-readable storage medium storing programs for causing computers to execute the image processing method of claim 1.

* * * * *